(12) United States Patent
Velazquez

(10) Patent No.: US 11,066,049 B2
(45) Date of Patent: Jul. 20, 2021

(54) CHAMOIS DRYING DEVICE

(71) Applicant: Sonia Velazquez, Orlando, FL (US)

(72) Inventor: Sonia Velazquez, Orlando, FL (US)

( * ) Notice: Subject to any disclaimer, the term of this patent is extended or adjusted under 35 U.S.C. 154(b) by 38 days.

(21) Appl. No.: 16/460,532

(22) Filed: Jul. 2, 2019

(65) Prior Publication Data

US 2021/0001821 A1 Jan. 7, 2021

(51) Int. Cl.
*A47L 13/16* (2006.01)
*A47L 1/15* (2006.01)
*B60S 3/04* (2006.01)
*B60S 3/00* (2006.01)

(52) U.S. Cl.
CPC ............... *B60S 3/002* (2013.01); *A47L 1/15* (2013.01); *A47L 13/16* (2013.01); *B60S 3/045* (2013.01)

(58) Field of Classification Search
CPC ... A47L 1/06; A47L 1/15; A47L 13/00; A47L 13/10; A47L 13/16; B60S 3/00; B60S 3/002; B60S 3/04; B60S 3/045; B08B 1/001; B08B 1/003; B08B 1/006
USPC ...... 15/118, 208, 209.1, 220.1, 244.1, 244.3, 15/244.4
See application file for complete search history.

(56) References Cited

U.S. PATENT DOCUMENTS

| | | | |
|---|---|---|---|
| 3,083,392 A * | 4/1963 | Sewell | A47L 13/16 15/118 |
| 3,629,896 A * | 12/1971 | Sirnec | A47L 13/16 15/118 |
| 4,670,962 A * | 6/1987 | Giallourakis | A47L 13/16 15/118 |
| 4,769,267 A * | 9/1988 | Hoyt | A47L 13/17 428/71 |
| 5,187,830 A * | 2/1993 | Giallourakis | A47L 13/16 15/209.1 |
| 5,361,445 A * | 11/1994 | Giallourakis | A47L 13/12 15/118 |
| 5,879,094 A * | 3/1999 | Lersch | B60S 3/047 401/139 |
| 7,020,929 B1 * | 4/2006 | Cantonis | A47L 13/16 15/209.1 |
| 2005/0273958 A1 * | 12/2005 | Dillon | A47L 13/16 15/104.93 |

FOREIGN PATENT DOCUMENTS

| | | | |
|---|---|---|---|
| DE | 3131833 | * | 2/1983 |
| GB | 11063 | * | 7/1916 |
| GB | 377747 | * | 8/1932 |
| GB | 1252390 | * | 11/1971 |

* cited by examiner

*Primary Examiner* — Mark Spisich
(74) *Attorney, Agent, or Firm* — Jason T. Daniel, Esq.; Daniel Law Offices, P.A.

(57) ABSTRACT

An improved chamois drying device includes a malleable chamois body having a pocket that is interposed between a front surface, a rear surface, a pair of opposing side edges, a bottom edge and a top edge. An absorbent sponge is positioned within the pocket of the chamois body and functions to remove water accumulated by the chamois body. The chamois body is constructed from one or more pieces of water repellant chamois and includes an opening that is in communication with the pocket for receiving and positioning the absorbent sponge. One or more connectors are positioned along either side of the opening to secure the opening into an open or a closed position.

4 Claims, 3 Drawing Sheets

CHAMOIS DRYING DEVICE

TECHNICAL FIELD

The present invention relates generally to cleaning products, and more particularly to an improved chamois vehicle drying device.

BACKGROUND

The statements in this section merely provide background information related to the present disclosure and may not constitute prior art.

There is no shortage of commercially available products such as soaps, buckets, towels, sponges and brushes, for example, that are used every day to wash and dry vehicles such as boats, motorcycles and automobiles, for example. To this end, when cleaning a vehicle, it is not uncommon to use a wet sponge that is impregnated with soap to scrub the surface of the vehicle before rinsing and drying the same with a clean towel or chamois.

Unlike towels, which are designed to absorb water, chamois are designed to act like a squeegee that repels/pushes water off the surface of the vehicle, thus reducing or eliminating water stains. Unfortunately, chamois accumulate moisture during use which reduces the effectiveness of the material. As a result, users must constantly fold and/or rotate the chamois during use until the entire material has been used. At this time, the material is degraded to the point where the user must obtain a second (or third) dry chamois to finish drying the vehicle.

Additionally, it is important to ensure the surface of the chamois that makes contact with the vehicle is smooth (e.g., does not have wrinkles or other surface variations) as this affects the ability of the chamois to remove moisture from the vehicle surface. Unfortunately, many users complain that the completely malleable nature of the chamois makes it difficult to hold, especially considering the number of times they have to fold and rotate the device during use. For each of these reasons, many users ultimately choose to employ a less effective cloth towel to dry their vehicles, which results in a lesser quality finish.

Accordingly, it would be beneficial to provide an improved chamois drying device that can be used to dry entire vehicles without suffering the drawbacks described above.

SUMMARY OF THE INVENTION

The present invention is directed to an improved chamois drying device. One embodiment of the present invention can include a malleable chamois body having a pocket that is interposed between a front surface, a rear surface, a pair of opposing side edges, a bottom edge and a top edge. An absorbent sponge is positioned within the pocket of the chamois body and functions to remove water accumulated by the chamois body.

The chamois body can be constructed from one or more pieces of water repellant chamois and can also include an opening that is in communication with the pocket for receiving and positioning the absorbent sponge. One or more connectors can be positioned along either side of the opening to secure the opening into an open or a closed position.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1A:
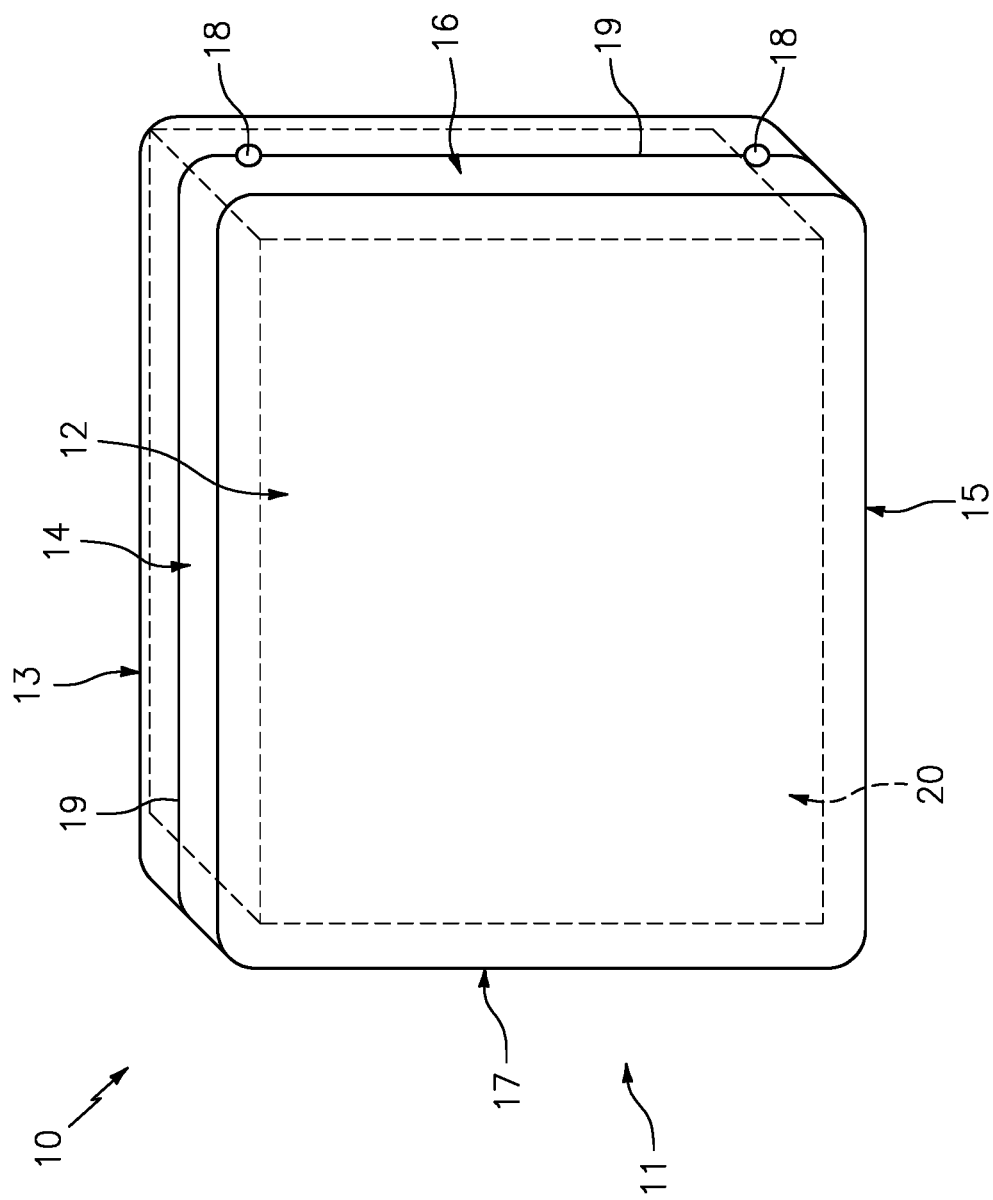
FIG. 1A is a top view of an improved chamois drying device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Although described throughout this document for use in drying various types of vehicles, this is for illustrative purposes only. As such, the inventive concepts disclosed herein can be utilized in any industry to dry and/or wipe any type of surface.

As described herein, the terms "connector" and "complementary connector" include any number of different elements that work together to repeatedly join two items together in a nonpermanent manner (i.e., removably connected). Several nonlimiting examples include opposing strips of hook and loop material (e.g., Velcro®), attractively oriented magnetic elements, flexible strips of interlocking projections with a slider (i.e., zipper), tethers, buckles, hooks, snaps and buttons, for example. Each illustrated connector and complementary connector can be permanently secured to the illustrated portion of the device via a permanent sealer such as glue, adhesive tape, or stitching, for example.

Various embodiments of an improved chamois drying device 10 are provided throughout the drawings to aid in understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1A illustrates one embodiment of an improved chamois drying device 10, that includes a chamois body 11 and an absorbent member 20 positioned therein.

As shown, the chamois body 11 can include a front surface 12, a rear surface 13, a top end 14, a bottom end 15, and a pair of opposing sides 16-17 that define a hollow interior pocket for receiving and storing the absorbent member 20. In the preferred embodiment, the chamois body can be constructed from a single piece of material that is folded to create the illustrated shape and that is secured along the edges via seams 19 such as stitches, silicone gel, fabric glue or seam tape, for example.

Of course, the chamois body is not limited to such a construction as the same may be constructed from any number of different materials that are secured together in any number of different manners. For example, depending on the intended use/industry for which the device is to be manufactured, the front surface 12 and the rear surface 13 may be identical, or may be different, in terms of construction material, and/or texture, for example.

Figure 1B:
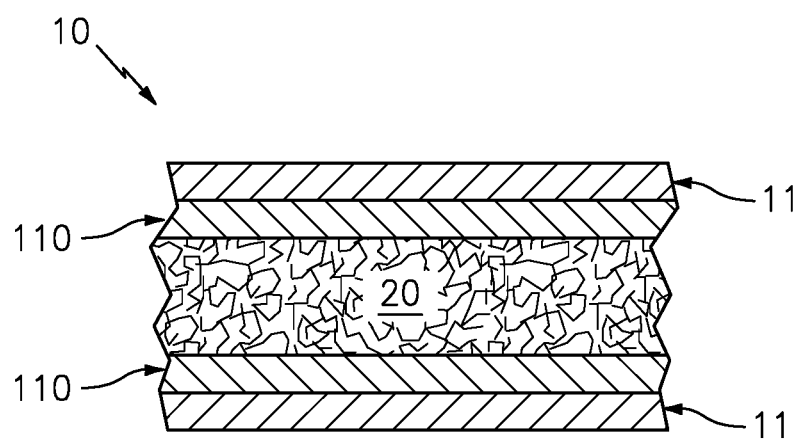
FIG. 1B is a cross sectional view of the chamois drying device, in accordance with one embodiment of the invention.

As shown at FIG. 1B, one embodiment of the device can include a two layer body construction 11 and 110 which are overlapping. Owing to the low water absorption qualities of the chamois body 110, the second chamois body 110 can push/repel moisture passing through the outer layer 11 down into the below described apertures where it can be removed from the device. As with the first layer, over time the second layer will also become saturated. When this occurs, moisture passing through the second layer can be absorbed by the below described absorbent member 20.

In the preferred embodiment, the chamois body 11 and/or 110 can be constructed from natural chamois leather and may be provided in a variety of different colors. Of course, the inventive concepts are not limited to the use of such a material as any number of other materials capable of pushing/pulling water from the surface of a vehicle may be utilized, such as synthetic chamois or shammies, for example.

As shown, the absorbent member 20 can be positioned within the interior pocket of the chamois body, and can function to actively pull moisture from the chamois, thus increasing the longevity of the chamois body. In the preferred embodiment, the absorbent member can include, comprise or consist of a synthetic or natural sponge; however, any number of other moisture absorbing materials such as various microfiber towels, absorbent foam pads and the like are also contemplated.

In one embodiment, one or more apertures 18 can be positioned along the device body, preferably along one of the sides 16 or 17. As will be described below, the aperture(s) provide an outlet for water that has been absorbed by the sponge to be easily released via a squeezing action.

Figure 2:
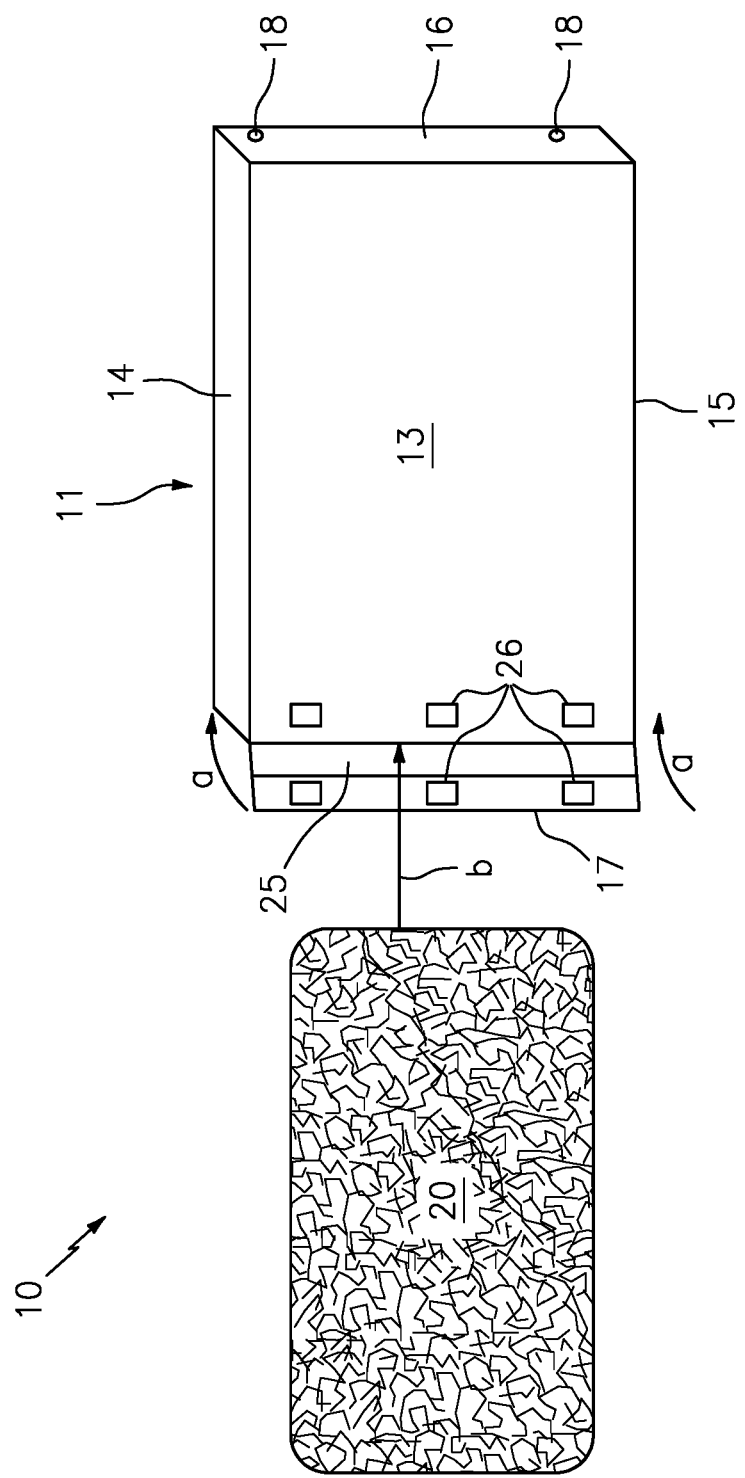
FIG. 2 is a top view of the chamois drying device, in accordance with one embodiment of the invention.

As shown in FIG. 2, one embodiment of the device 10 can also include functionality for allowing the absorbent member 20 to be removably secured within the chamois body 11. As shown, one side of the chamois body can include a closure/flap 25 for accessing the pocket 19 defined by the body segments 12-17. To this end, a plurality of connectors 26, such as hook and loop elements, for example, can be secured onto the chamois body in order to allow a user to selectively position the flap 25 between an open position and a closed position as shown by arrow a.

As shown by arrow b, the absorbent member 20 can be inserted and removed through the flap 25 of the chamois main body, in order to allow removal and/or replacement of the absorbent member 20. Such a feature also assists with allowing a user to quickly and easily remove water collected by the absorbent member during use.

Although dimensions are not critical, in the preferred embodiment the chamois body 11 and the absorbent material 20 can each include the illustrated rectangular shape having a preferred length (e.g., distance between sides 16 and 17) of between approximately 7.5 to 9 inches, a preferred width (e.g., distance between top and bottom surfaces 14 and 15) of approximately 5.2 inches and a preferred height/depth (e.g., distance between front and rear surfaces 12 and 13) of approximately 2.5 inches. These dimensions being specifically chosen to fit and conform to the shape of an average adult hand so as to provide the user with an ergonomic handhold during use, thereby eliminating hand cramping and other issues typically encountered when drying with a regular chamois or towel. Additionally, these dimensions have shown suitable for allowing a single device to dry a full-size automobile.

Of course, any number of other shapes and sizes are also contemplated. For example, other embodiments are contemplated wherein the chamois body includes a different shape than the absorbent member and/or wherein multiple different absorbent members 20 are disposed within a single chamois body.

In operation, the device 10 can be used to dry the surface of any number of different objects such as cars, boats and/or motorcycles, for example. In this regard, a user can simply grasp the soft ergonomic shape and place any surface of the device against the wet vehicle. As the user pushes or pulls the device, the chamois material will squeegee a majority of the water from the surface, and will absorb a small amount with each pass.

As the water accumulates on the chamois body and passes to the interior pocket, it can be actively removed through absorption by the sponge 20. Such a feature allows prolonged and continuous use of the chamois body without buildup of moisture. Moreover, at any time during the drying procedure, the user can release the water absorbed by the sponge by simply squeezing the sponge and chamois body in order to expel the water from the sponge through the apertures 18, and/or by removing the sponge via the flap 25 and squeezing the same outside of the chamois body 11.

Accordingly, the inventive concepts disclosed herein represent significant improvement to the art by providing an improved chamois drying device that eliminates known drawbacks in a novel and nonobvious manner.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A drying device, comprising:
  a malleable chamois body having an outer layer of chamois material, and an inner layer of chamois material that is positioned against an inside facing surface of the outer layer of material;
  said outer layer and inner layer forming a shape having a front surface, a rear surface and a plurality of side edges that define a hollow interior space, said malleable body configured to repel water, a first one of said side edges and a second one of said side edges being located at opposed ends of the chamois body, the first side edge provided with at least one aperture and the second side edge including an opening allowing access to the hollow interior space, the second side edge further comprising a closure member movable between an open and a closed position and provided with at least one connector for retaining it in either the closed or the open position;
  an absorbent member that is removably positioned within the interior space of the chamois body via the closure member; and
  wherein the absorbent member is configured to actively remove any water that is absorbed by the chamois body during use with any excess water being able to be removed by the aperture in the first side edge.

2. The device of claim 1, wherein the absorbent member comprises:
  a sponge.

3. The device of claim 1, wherein the front surface and the rear surface of the main body comprise a continuous non-apertured and smooth surface.

4. The device of claim 1, wherein the at least one connector comprises:
  a hook and loop material.

* * * * *